(12) United States Patent
Smith et al.

(10) Patent No.: US 6,353,988 B1
(45) Date of Patent: Mar. 12, 2002

(54) METHOD OF INSTALLING A HIGHLY TENSIONED SUSPENDED PIPELINE

(75) Inventors: Robert E. Smith, Dallas, TX (US); James D. Hart, Walnut Creek, CA (US)

(73) Assignee: Atlantic Richfield Company, Chicago, IL (US)

( * ) Notice: Subject to any disclaimer, the term of this patent is extended or adjusted under 35 U.S.C. 154(b) by 0 days.

(21) Appl. No.: 09/513,120

(22) Filed: Feb. 25, 2000

(51) Int. Cl.[7] ................................................ B23P 11/02
(52) U.S. Cl. ............................ 29/446; 138/107; 248/58
(58) Field of Search .......................... 29/446, 434, 467; 248/49, 58; 138/107

(56) References Cited

U.S. PATENT DOCUMENTS

| | | | | |
|---|---|---|---|---|
| 3,648,468 A | * | 3/1972 | Bowers | |
| 3,767,149 A | * | 10/1973 | Hill | |
| 4,128,219 A | * | 12/1978 | Kaigler, Jr. et al. | |
| 4,139,142 A | * | 2/1979 | Maple et al. | |
| 4,140,292 A | * | 2/1979 | Kaigler, Jr. | |
| 4,147,455 A | * | 4/1979 | Bertaccini | |
| 4,560,125 A | * | 12/1985 | Hess | |
| 5,873,522 A | * | 2/1999 | Roberts | |

* cited by examiner

*Primary Examiner*—David P. Bryant
(74) *Attorney, Agent, or Firm*—James A. Gabala; F. Lindsey Scott

(57) ABSTRACT

A highly tensioned, suspended pipeline (HTSP) which is especially useful in permafrost regions, rugged terrain, and active seismic fault areas. Basically, the pipeline is comprised of segments which are fluidly connected together to form the desired length of the line. Each segment is comprised of a length of tensioned pipeline which extends between two fixed anchors and which is suspended over a plurality of vertical support towers therebetween. The length of pipeline is greater than the distance between the anchors to allow the pipeline to sag significantly between adjacent vertical supports whereby there is no need for expansion loops in the line.

8 Claims, 7 Drawing Sheets

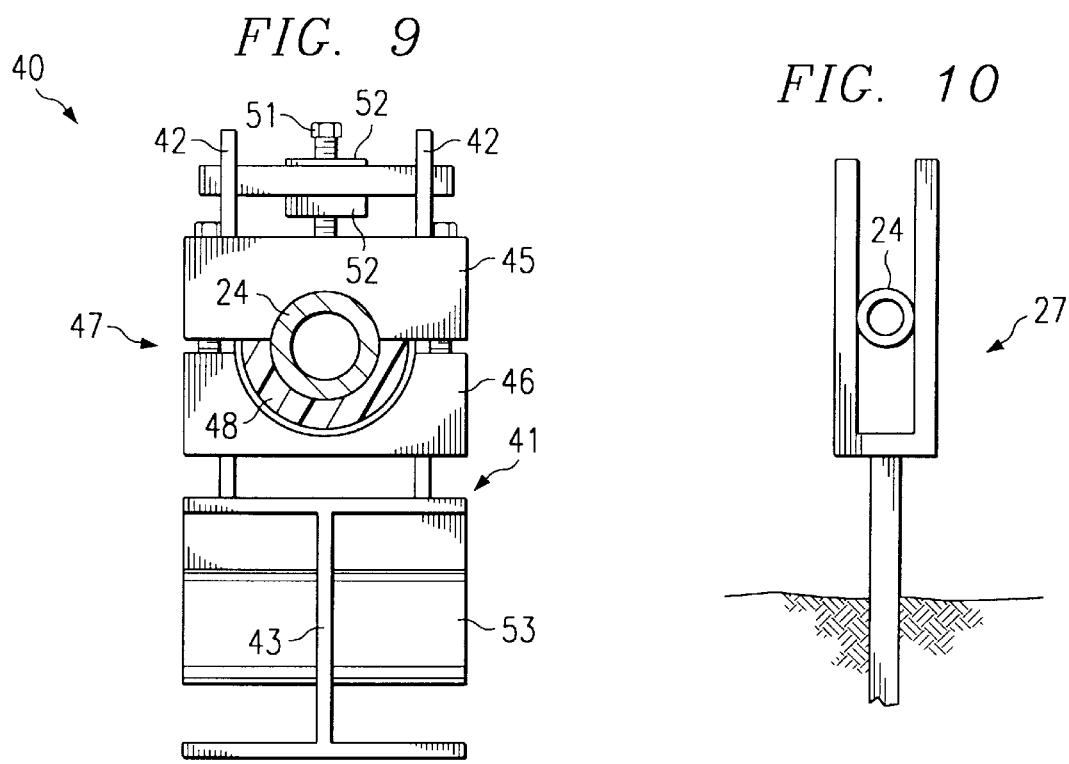
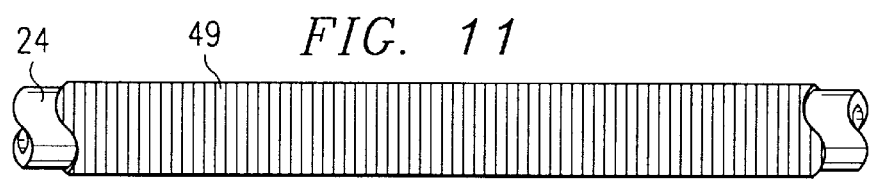

METHOD OF INSTALLING A HIGHLY TENSIONED SUSPENDED PIPELINE

TECHNICAL FIELD

The present invention relates to a highly tensioned suspended pipeline and method of installing and in one aspect relates to a highly tensioned suspended pipeline which is especially useful in ice-rich, permafrost regions, rugged terrain, and across active seismic faults.

BACKGROUND

It is well known that land-based pipelines are commonly used to transport hydrocarbons (e.g. oil and/or gas) from remote production areas to processing and/or end use facilities. Due to esthetics, economics, and other reasons, these pipelines are typically buried in the ground wherever practical. However, in some regions, buried pipelines can not be used because of the nature of the terrain through which the pipeline passes; e.g. ice-rich, permafrost regions, rugged terrain, active seismic faults, etc. In these types of terrain, elevated pipelines are often used to transport the hydrocarbons to their destinations.

For example, in building conventional elevated pipelines across permafrost terrain of North Slope, Alaska, a plurality of substantially aligned, vertical supports (e.g. 5-foot tall) are installed across the terrain at approximately 45 to 65 foot intervals. A long section of pipeline is welded together and then raised onto these vertical supports. Sliding surfaces are provided between the pipeline and each of the vertical supports to thereby allow slight relative movement therebetween. At spaced intervals, (e.g. 1500 feet), the pipeline is fixed to a vertical and horizontal anchor.

"Expansion loops" are spaced (e.g. every 1500 feet) within the pipeline to compensate for any substantial thermal expansion/contraction of the pipeline between any two adjacent fixed anchors. Therefore, every mile of conventional, elevated pipeline normally requires about 100 vertical supports, 100 sliding surfaces, 4 expansion loops, and 4 fixed anchors required thereby producing a relatively large "footprint" (i.e. the actual surface area required in install the pipeline) and numerous ground penetrations for pilings and the like. The "footprint" and the number of ground penetrations may be both esthetically and ecologically undesirable in many regions where such pipelines are needed. Further, the installation of many, closely-spaced vertical supports, anchor supports, and the expansion loops required for a conventional elevated pipeline is both expensive and time-consuming.

Accordingly, it should readily be apparent that there is a continuing need to improve elevated pipelines while, at the same time, reducing the costs of installation. Also, in ecology-sensitive areas such as those covered by tundra/permafrost, it is important to reduce the "footprint" of the pipeline without reducing the reliability/durability of the pipeline.

SUMMARY OF THE INVENTION

The present invention provides a highly tensioned, suspended pipeline (HTSP) which is especially useful in permafrost regions, rugged terrain, and across active seismic fault areas and a method for installing the pipeline. Basically, the pipeline is comprised of segments which are fluidly connected together to form the desired length of the line. Each segment is comprised of a length of pipeline which extends between two fixed anchors and which is suspended over a plurality of vertical support towers which are spaced between the two anchors. The length of pipeline is greater than the distance between the anchors to allow the pipeline to sag significantly between adjacent vertical supports.

More specifically, each segment of HTSP is comprised of a first fixed anchor support at the beginning of the segment and a second fixed anchor support at the other end of said segment. A plurality of vertical supports are spaced at intervals between the two anchors. A length of pipeline is anchored at one end to the first anchor and tensioned from the other end as it lays on the ground along side the vertical supports. The pipeline is of sufficient length to permit said pipeline to sag significantly in a downward arc between adjacent vertical supports to a low point which is about 5 feet above the ground when the pipeline is positioned on the vertical supports. Intermediate supports are positioned between adjacent vertical supports to reduce transverse movement of the pipeline.

Preferably, each vertical support is comprised of a base which is affixed to said ground and which has a support frame pivotably mounted thereon. The pipeline is secured in a saddle assembly which, in turn, is pivotably attached to the upper end of the support frame. A flexible sleeve can be positioned on the pipeline at the point where the pipeline is secured within the saddle assembly to prevent crimping and/or flattening during bending of the pipeline.

To install the segment of the present HTSP, the first and second anchors are installed from about 1 mile to about 1.5 miles apart. The vertical supports are positioned at spaced intervals (e.g. 500–700 feet) between said first and said second anchors. The required length of pipeline is assembled and lies on the ground between said first and said anchors with the length of pipeline being greater than the distance between the two anchors. One end of the pipeline is fixed to said first anchor and a tensile force is applied in the pipeline by pulling on the other end.

The length of pipeline is then sequentially lifted onto said vertical supports at predetermined pick-up points while tension is maintained in the pipeline whereby the pipeline becomes supported on the vertical supports. The pick-up points are chosen so that the pipeline will sag significantly in a downward arc between adjacent vertical supports to a low point (e.g. a point about 5 feet off the ground). As the last saddle assembly is lifted onto its respective vertical support, a stop, affixed to the other end of the pipeline, will press against the second anchor and be able to rotate about the horizontal axis that, in turn, is perpendicular to the pipeline and parallel to the ground. Basically identical additional segments of the pipeline are then installed and fluidly connected together to complete the HTSP of the present invention.

BRIEF DESCRIPTION OF THE DRAWINGS

The actual construction, operation, and apparent advantages of the present invention will be better understood by referring to the drawings which are not necessarily to scale and in which like numerals identify like parts and in which:

FIG. 9 is an end view of the saddle unit of FIG. 7;

FIG. 10 is an enlarged, end view of an intermediate support of the pipeline shown in FIG. 2;

FIG. 11 is an enlarged view, partly broken away, of a flexible sleeve which is positioned onto portions the pipeline shown in FIG. 2 to prevent crimping and/or flattening of the pipe during lifting and placing of the pipe onto the vertical supports;

BEST KNOWN MODE FOR CARRYING OUT THE INVENTION

Figure 1:
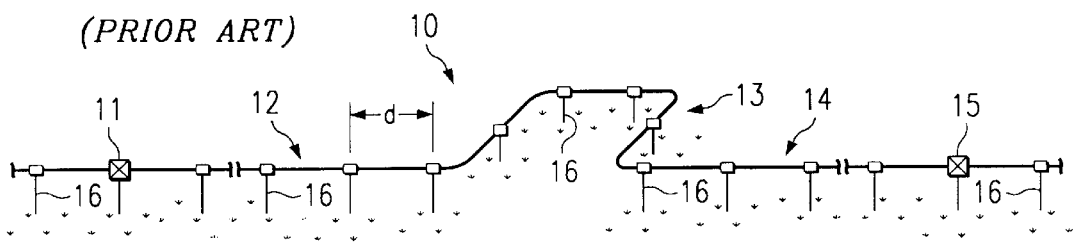
FIG. 1 is a schematic illustration of a typical, prior art elevated pipeline.

Referring more particularly to the drawings, FIG. 1 schematically represents one segment of a typical, prior art, elevated pipeline 10 of the type used in arctic regions or similar terrain to transport hydrocarbons or other fluids to a destination point. Each segment of pipeline 10 is typically comprised of a first fixed anchor 11, fifteen to twenty straight lengths of pipe (welded together and shown collectively as integral length 12), an expansion loop 13, an additional fifteen to twenty straight run lengths of pipe (integral length 14), and a second fixed anchor 15. With the exception of alignment changes or road crossings or the like, this configuration of each segment of pipeline 10 is repeated between additional spaced anchors (not shown) until the total, desired length of the elevated pipeline is complete.

Each segment of conventional, elevated pipeline 10 is constructed by welding substantially uniform joints of pipe together as the joints lie along vertical supports 16 which, in turn, are spaced from each other at an uniform distance "d" (e.g. from about 45 to about 60 feet). The welded pipeline is then lifted onto the vertical supports. The pipe is designed to have only a slight, if any sag, (e.g. approximately one inch or less) between adjacent supports 16 when the pipeline is assembled in an operable position. At each of the vertical supports 16, the pipe is supported on saddles (not shown) which, in turn, bear on a wide flange beam through special slide pads (not shown) to allow slight relative movement between the pipe and the vertical support.

Vertical supports 16 are basically designed to provide vertical and transverse horizontal support for the pipeline with negligible longitudinal support. As will be understood in this art, substantially all of the thermal expansion in the pipeline will be absorbed by the pipe bending action in the expansion loops 13 where the pipe is supported on vertical supports 16 by friction slider supports (not shown).

Fixed anchors 11 and 15 and adjacent expansion loops 13 (only one shown) are installed, respectively, at approximately 1500 feet from each other. Therefore, every one mile of the prior-art, elevated pipeline 10 requires some one-hundred (100) vertical supports 16, one hundred (100) sliding surfaces, four (4) expansion loops 13, and four (4) fixed anchors 11, 15. The use of such a large number of components results in a pipeline having a large, undesirable "footprint" and adds substantially to the costs in constructing the pipeline, especially in ecology-sensitive areas.

Figure 2:
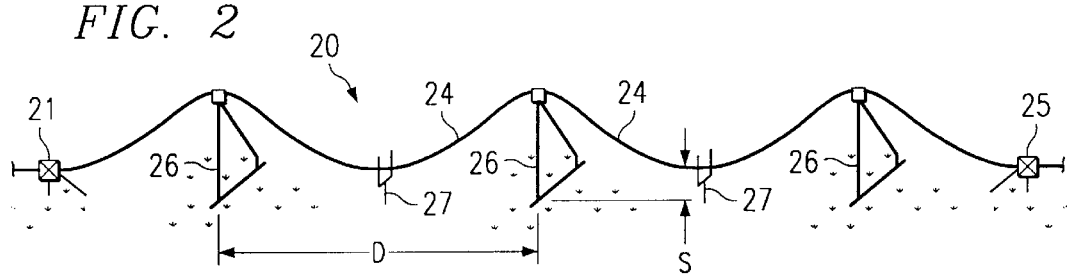
FIG. 2 is a schematic illustration of the high tensioned, suspended pipeline of the present invention.

Now referring to FIG. 2, a segment of the highly tensioned, suspended pipeline system 20 (HTSP) of the present invention is schematically illustrated. A segment of HTSP 20 is comprised of a plurality (e.g. ten) of vertical supports 26 (e.g. 20–30 feet tall) which are spaced from each other at a distance "D" of from about 500 to about 700 feet (may be greater or smaller in some instances).

A HTSP span of pipe 24 between two adjacent vertical supports is radically different from a conventional span (FIG. 1) in that the weight of the pipe is carried mainly by axial tensile force in the pipe (i.e. cable action) instead of by beam action in a conventional elevated pipeline. This allows a segment of the present HTSP to extend across several hundred feet as compared to only about 45–65 feet for segment of a conventional elevated pipeline. Therefore, fewer vertical supports are needed for installing the HTSP pipeline of the present invention than was needed for the same length of conventional elevated pipeline. Fixed anchors 21, 25 are positioned at either end of a segment of HTSP pipeline 20 and are spaced from about 1 mile to about 1.5 miles from each other. Intermediate supports 27, which do not support the weight of the pipeline span, are installed between vertical supports 26 to prevent transverse movement of the pipeline due to wind or the like and also allows for vertical movement due to thermal and pressure changes.

Figure 5:
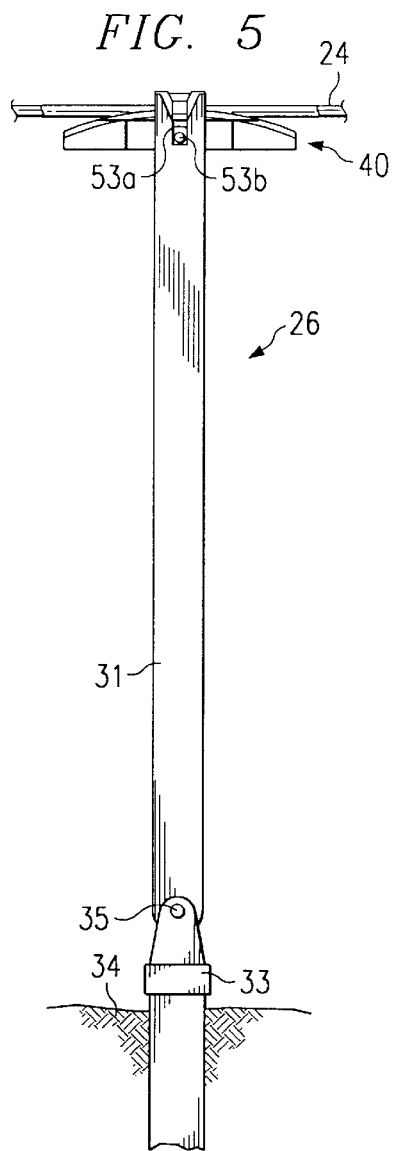
FIG. 5 is a side view of a vertical support of the pipeline shown in FIG. 2.
Figure 4A:
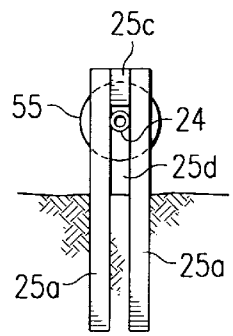
FIG. 4A is an end view of a fixed anchor support of FIG. 4.
Figure 6:
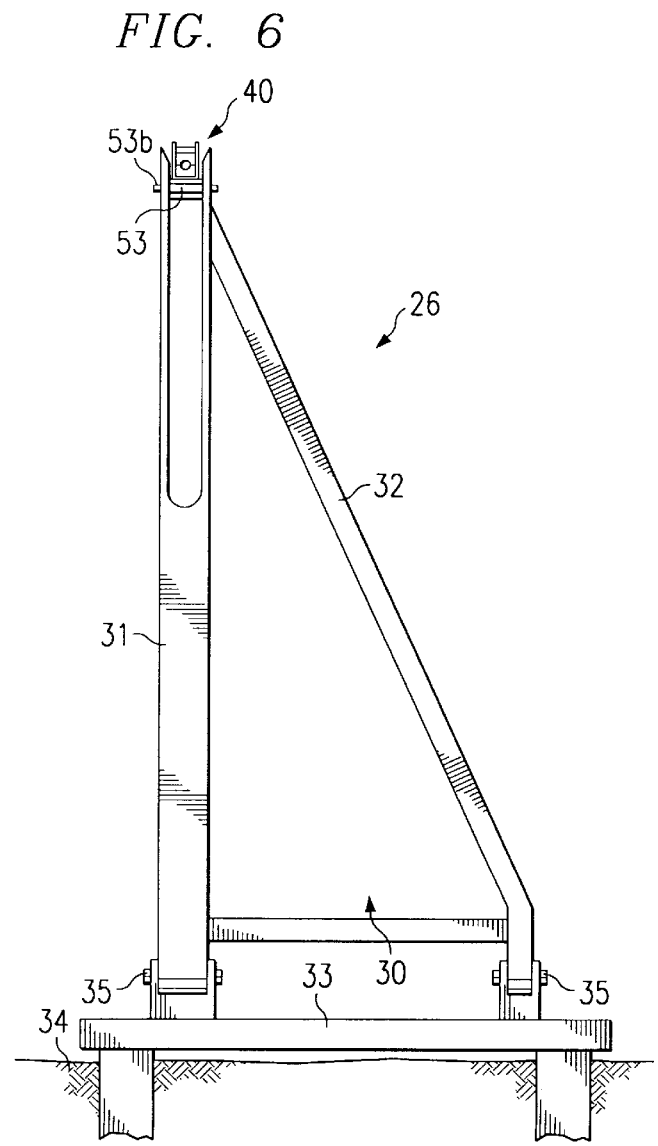
FIG. 6 is a end view of the vertical support of FIG. 5.

Vertical supports 26 may take various forms but must be stiff enough to prevent lateral movement in the direction transverse to the pipeline and strong enough to resist wind and earthquake loads. The towers do not have to be stiff in the longitudinal direction and can be flexible or preferably be pivotable about the base of the support. Referring now to FIGS. 5 and 6, a preferred vertical support or tower 26 is comprised of a triangular frame 30 with the legs 31 and 32 being pivotably connected by pins 35 to a base 33 which, in turn, is securely fixed in the ground 34. This allows vertical support 26 to rotate about pins 35 in a longitudinal direction but movement in the transverse direction is prevented. Each vertical support 26 is adapted at its upper end to receive and secure a saddle assembly 40, which will be described in detail below. The saddle assembly 40 and the pipeline secured thereto can rotate relative to the vertical support via pin 53 and thereby stay essentially horizontal at its support point. This reduces cyclic stresses at the support point.

Figure 12:
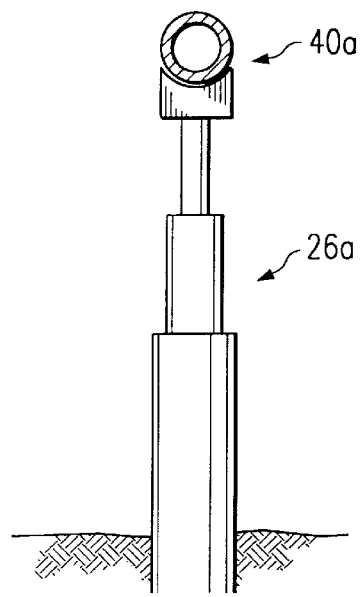
FIG. 12 is an end view of another embodiment of a vertical support which can be used in the pipeline shown in FIG. 2.

Another embodiment of a vertical support which can be used in the present invention is shown in FIG. 12 wherein the support 26a is comprised of a single column which is flexible in the longitudinal direction and much stiffer in the transverse direction thereby allowing longitudinal movement but preventing transverse movement.

Figure 7:
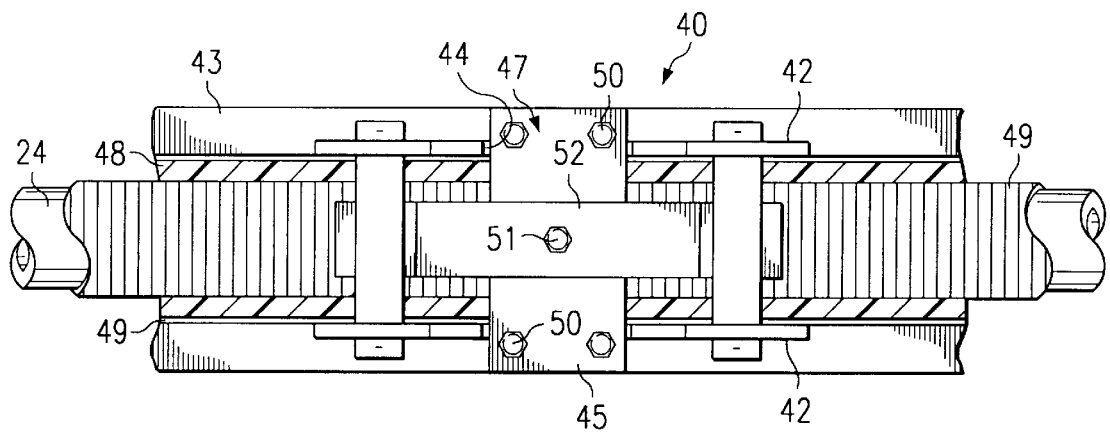
FIG. 7 is an enlarged, top view of a saddle unit of the pipeline of FIG. 2 with the pipeline clamped therein.
Figure 8:
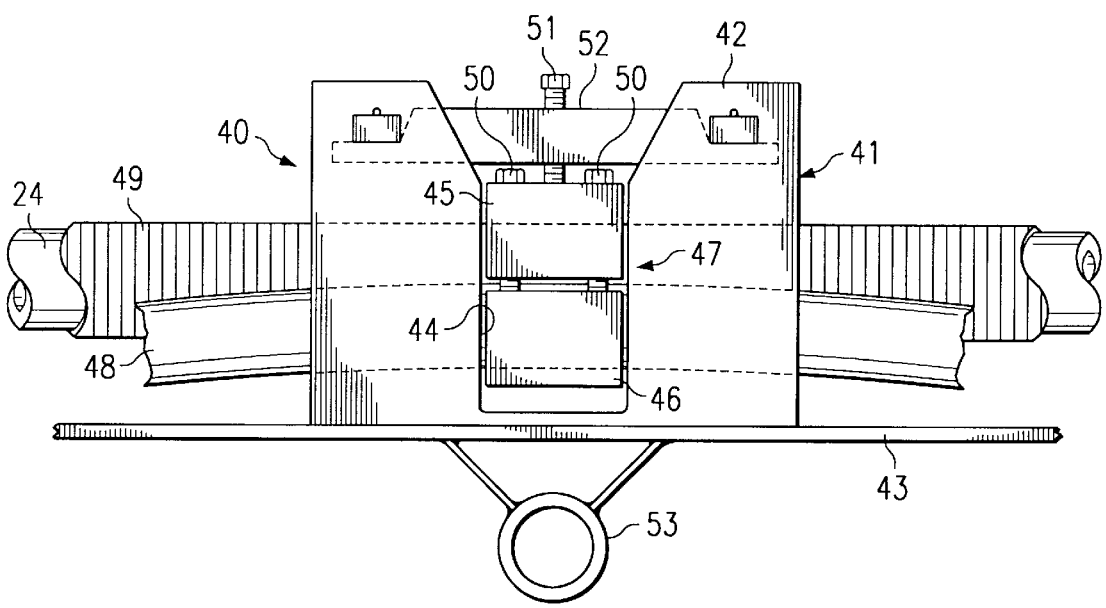
FIG. 8 is a side view, partly broken away, of the saddle unit of FIG. 7.

Referring now to FIGS. 7–9, the saddle assembly 40 of the present invention is illustrated. Basically, assembly 40 is comprised of a frame 41 which has two opposing sides 42 which, in turn, extend upwardly from base 43. Each side 42 has a slot 44 therein adapted to receive both upper member 45 and lower member 46 of clamp 47. A gradually curved chute 48 is positioned within the lower member 46 and serves to limit the bending of pipe 24 when said pipe is secured into saddle assembly 40 and lifted onto a vertical support as will be explained below. Chute 48 may be formed from half of a pipe having a slightly larger diameter than pipe 24.

If required to prevent crimping and/or flattening of the pipe, prior to placing pipe 24 into saddle assembly 40, a flexible sleeve 49 (FIGS. 7, 8 and 11) is positioned over the pipe 24 which then is laid on to the pliant cushion 49 (e.g. rubber) which is positioned within the chute 48 which, in turn, is positioned within the lower member 46 of clamp 47. Pliant cushion 49, in addition to providing a cushioned surface between chute 48 and the pipe 24, also acts to dampen harmonic or other forces which may develop in the pipeline between vertical supports 26. Other dampening means (not shown) can be installed on the pipeline as needed, e.g. pliant cushion on intermediate supports 27, etc.

Flexible sleeve 49 may be comprised of a slotted metal sleeve, a pipe which is cut to form a helix or a series of stiff circular rings, etc. Flexible sleeve 49 is secured by welding or clamping or is thermally shrunk onto the pipe to prevent longitudinal movement of the sleeve along the pipeline. Upper member 45 is then positioned over the pipe 24 and the two members of clamp 47 are secured together by bolts 50 or the like. The assembled clamp 47 and pipe 24 is positioned within the slots within the sides 42 of frame 41 and is secured therein by bolt 51 which, in turn, is threaded through plate 52. A cross-cylinder 53, welded to base 43 is used for mounting saddle assembly 40 onto vertical support 26 as will be explain in more detail below.

To assemble and install HTSP pipeline 20 of FIG. 2, reference is now made to FIGS. 3A–3D, 4, and 4A. First, first and second fixed anchor supports 21, 25 of FIG. 2 are installed at the beginning and at the end of a segment of pipeline 20 (e.g. from about 1 mile to about 1.5 miles apart). While the anchors may take other constructions, as shown, each anchor is of basically the same construction so only one will be described in detail. Each anchor (e.g. anchor 25) is comprised of two vertical posts 25a (see FIG. 4A) which are set in the ground and braced by angled members 25b. The posts 25a are connected together at their upper ends by a cross-member 25c thereby forming a slot 25d between the posts through which the pipeline 24 can slide, the purpose of which to be described below. The slot 25d extends from the ground to a desired elevation (e.g. 5 feet above ground) which, in turn, will be substantially equal to "S" (FIG. 2) which is the minimum distance that pipeline 24 will lie above the ground when the pipeline achieves maximum sag between any two adjacent vertical supports.

Next, or while the anchor supports are being installed, all of the permanent vertical supports or towers 26 are installed at precision surveyed locations (e.g. from about 500 to about 700 feet apart) along a substantially straight line between the anchor points; the exact distances depending on a particular application. As shown in FIGS. 5 and 6 and described above, vertical supports 26 are about 25 to 30 feet tall and are flexible in the longitudinal direction, e.g. pivoted about pins 35. While the triangular construction of the supports 26 will brace the supports against transverse movement, each support may have be temporarily guyed to maintain it in its vertical position until the pipeline has been installed.

The total length of segment 24 of the pipeline which is to be installed between anchor supports 21 and 25 is then assembled. This may be pre-insulated or un-insulated pipe or it may be a continuous length of coiled tubing. Where the pipeline is made up of joints of pipe, the joints are welded together while the pipeline is laying on the ground. The segment 24 is then inspected in accordance with conventional procedures. Each point at which a saddle assembly 40 is to be clamped onto the segment 24 (i.e. "pick-up point) is carefully measured and marked. The pick-up points will be spaced from each other at a distance equal to the distance between vertical supports 26 plus the extra length of pipe required to allow the desired sag in the pipeline between supports. Each saddle assembly 40, including flexible sleeve 49, can then be assembled at its respective pick-up point along the pipeline or it can be assembled at the same time the saddle is to be connected onto its respective vertical support.

Figure 4:
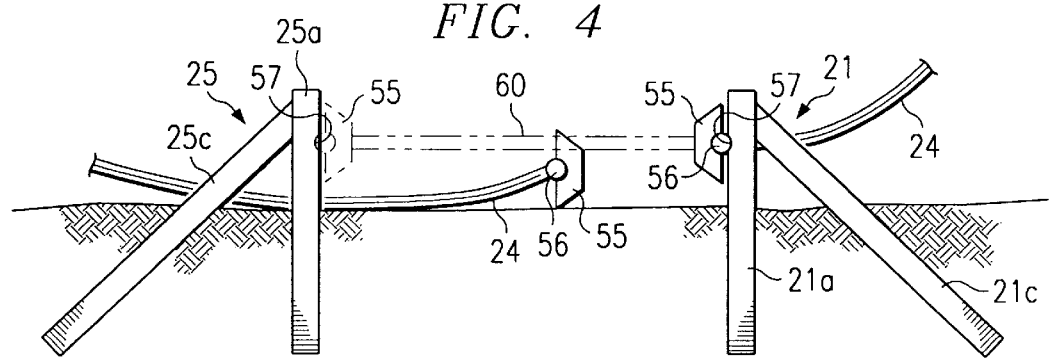
FIG. 4 is a simplified, elevational view of two adjacent fixed anchor supports of the pipeline of FIG. 2 as the suspended pipeline is being installed.

Stops 55 are welded or otherwise secured to either end of the segment 24 after the pipeline has passed through their respective slots in anchors 21, 25, respectively. As best seen in FIG. 4, each stop 55 includes a means 56 which allows free transverse rotation of segments 24 and 60 during installation and during service life. As shown, this means 56 is comprised of a pipe or the like (end of pipe shown in FIG. 4) which is secured to stop 55 and which is adapted to be received in a arcuate recess 57 in respective anchor posts 21a, 25a to thereby allow relative rotation therebetween. Both means 56 and stops 55 have aligned openings (not shown) through which the respective ends of pipeline segments 24 and 60 pass before the respective stops are secured to the pipeline.

As viewed in FIGS. 3A–3D, 4, and 4A, the right end of segment 24 of the pipeline 20 is placed through the slot 25d in anchor support 25. Then the stop 55 is attached to segment at precisely measured desired point. Then a pulling force is applied by a jacking system (not shown). This pulling is continued until a tension force is developed throughout the entire length of segment 24 which is approximately equal to the erection tension force for the empty pipeline segment. Since it is necessary to control the axial tension in the segment 24, it is important to account for the longitudinal friction effects. Accordingly, it may be desirable to support the segment of pipeline 24 on temporary support elements (e.g. air bags, rollers, etc.) (not shown) which are spaced at 50 to 70 foot intervals along its length until the pipeline is installed. In arctic conditions, the pipe may be laid on ice roads or the like which may reduce the need for other friction reducing methods.

When stop 55 is attached to pipeline segment 24 and the desired tension force has been developed in pipeline segment 24, the right end of pipeline segment 24 will extend through and past anchor 25 by several feet, depending on the number of vertical supports 26, the desired tension, the calculated sag of the installed pipeline between vertical supports 26, etc., involved in a particular installation (see FIG. 4). While carefully monitoring and maintaining the tension force along the pipeline segment 24, the first saddle assembly 40 (FIG. 3B) with the pipe 24 secured therein is gradually lifted by any appropriate hoisting apparatus (not shown) onto its vertical support tower 26. The saddle assembly and pipe is lifted to a height which is slightly higher that the top of the vertical support 26 in order to then lower or stab the "male base" 53 FIGS. 6 and 8) of the saddle assembly into a female slot 53a (FIG. 5) where it is secured by pin 53b or the like. Alternately, the saddle assembly 40 can first be lifted and secured on a vertical support 26 and then the pipe 24 can then be lifted into the saddle assembly and secured therein by clamp 47 as described above.

Figure 3A:
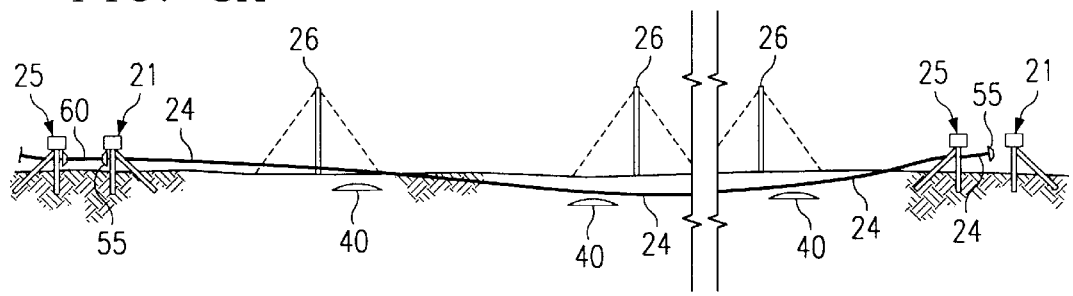
FIGS. 3A–3D schematically illustrate the sequence of steps typically carried out in installing the present pipeline.
Figure 3B:
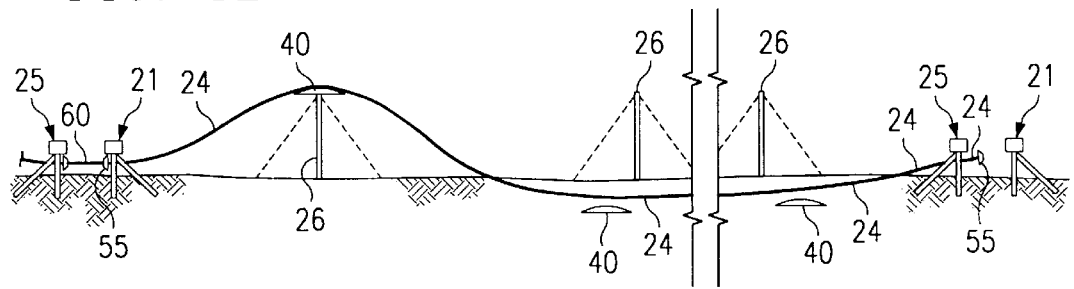
Figure 3C:
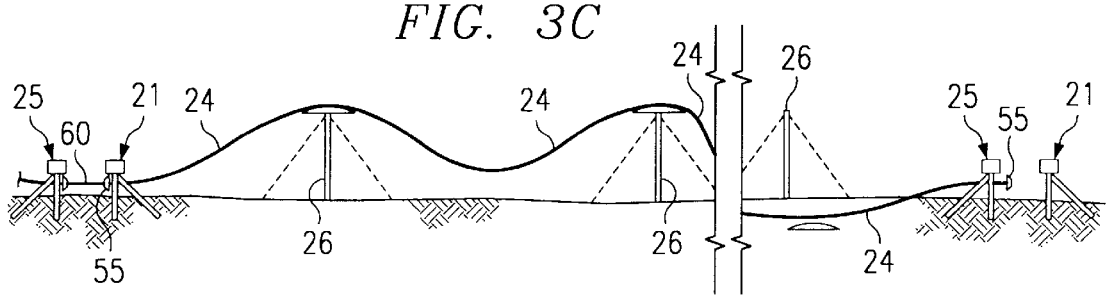
Figure 3D:
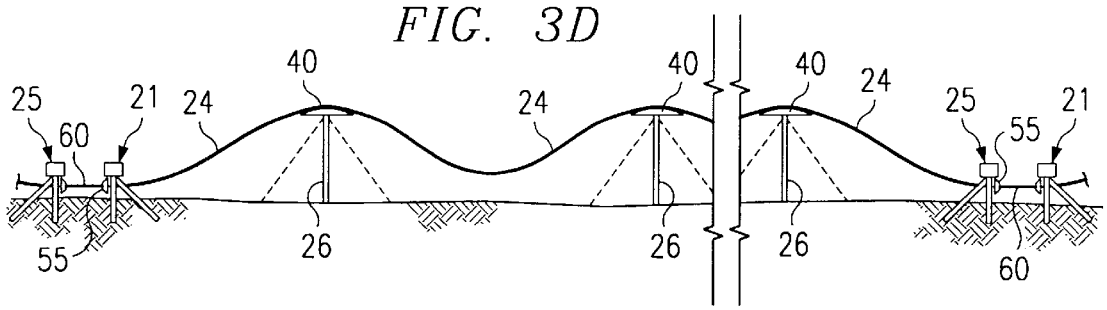

The hoisting apparatus is then moved to the second vertical support 26 to lift the second saddle assembly 40 and pipe 24 onto the second support (FIG. 3C) and so on until all of the saddle assemblies have been positioned onto their respective vertical supports (FIG. 3D). If the vertical supports have been guyed for vertical stability, the guy wires can be removed from each vertical support 26 after its respective saddle assembly and pipe has been positioned thereon. This allows the vertical support 26 to tilt longitudinally, if necessary, to equalize the tension in the adjacent pipe spans between supports 26. Once pipe 24 is attached to the vertical support 26 through its respective saddle assembly 40, there is no danger of longitudinal instability provided that tension is maintained in pipe segment 24.

As the pipeline 24 is progressively lifted onto its respective vertical supports, the pipeline will be allowed to "sag" significantly through a substantially uniform arc between adjacent vertical supports 26 to a low point (e.g. a point about 5 feet above the ground). Also, the right end (FIG. 4) will be progressively moved inward through slot 25d toward anchor support 25 as the pipeline is positioned on supports 26. If the segment of pipe 24 has been accurately laid out, and if temperature effects have been properly taken into account, the stop 55 on the end of the pipe should come into substantially abutment with anchor support 25 at its desired elevation as the last saddle assembly 40 is lifted onto the last vertical support 26, requiring only minor shimming or other slight adjustment at anchor 25. Intermediate supports (FIGS. 2 and 10) are installed between adjacent vertical supports 26 to prevent transverse movement of the pipeline 24 due to wind or other action.

The above-described installation procedure is repeated for each segment 24 of HTSP pipeline 20 until the desire length for the pipeline is completed. That is, a beginning anchor 21 and an ending anchor 25 is installed for each segment 24 of HTSP 20 and a segment 24 is installed therebetween until the desired length of the pipeline is completed. The beginning anchor 21 of an following segment 24 is spaced from the end anchor 25 of a preceding section at a relatively short distance, e.g. 30 to 100 feet. The end of the pipeline of the preceding segment is then fluidly connected to the end of the next segment of pipeline by an un-tensioned span 60 of pipe (FIG. 4).

The present HTSP allows a "one-time" pipe yield to occur at each of the vertical support 26 locations. This yield is due mainly to the bending action resulting from the overbending action that occurs as the tensioned pipe 24 is lifted to the top of each support 26. As the pipe bends over a saddle 40, it will come to rest in curved chute 48 which along with flexible sleeve 49 prevents the pipe from crimping and/or flattening. After the pipe bends across saddle 40, pipe 24 easily supports itself predominately by axial tension in the pipe. Also, the pipe has ample hoop strength to resist pressure loads.

Figure 13:
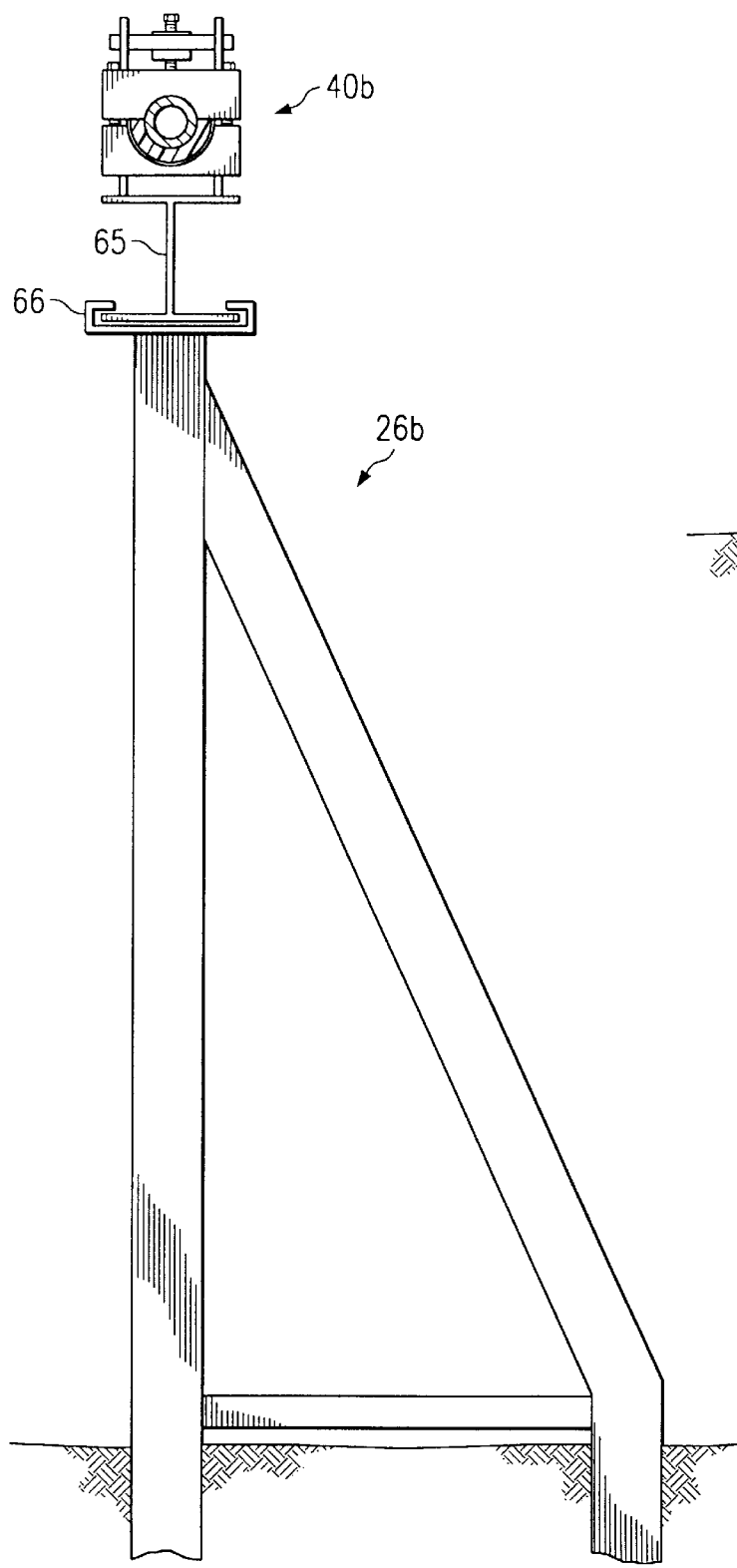
FIG. 13 is an end view of a still further embodiment of a vertical support which can be used in the pipeline shown in FIG. 2.
Figure 14:
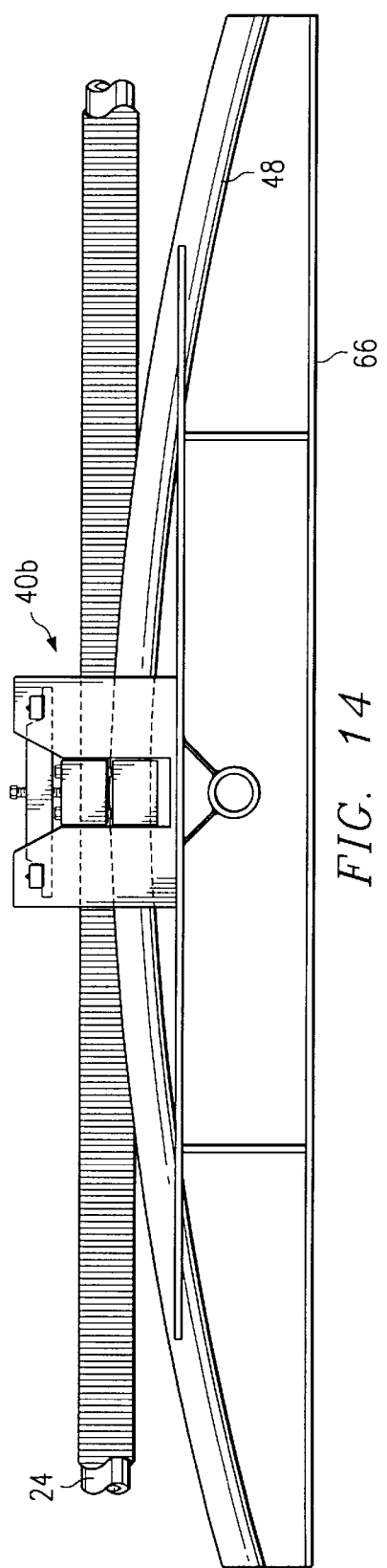
FIG. 14 is an enlarged side view of the saddle unit used with the vertical support of FIG. 13.

FIGS. 13 and 14 illustrate an embodiment of the present invention wherein the vertical support 26b is not pivotably mounted with relation to the ground but instead is fixed thereto. The desired longitudinal movement between the support 26b and saddle assembly 40b is provided by a slidably connection therebetween. A slide member 65 on the base of saddle assembly 40b is slidably positioned into a track 66 which, in turn, is secured onto the top of support 26b thereby allowing limited longitudinal movement therebetween.

Figure 15:
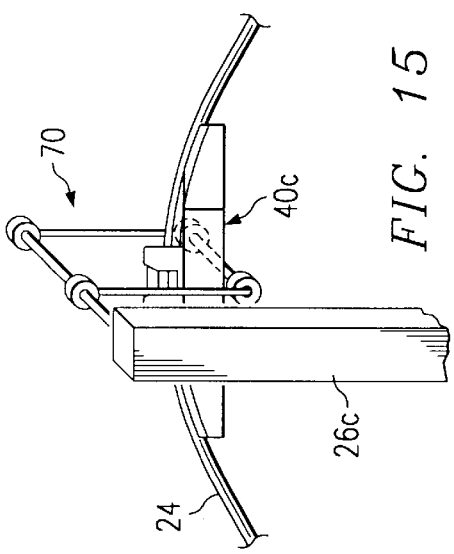
FIG. 15 schematically illustrates an alternate means for suspending the pipeline from a vertical support.

FIG. 15 schematically illustrates a further embodiment of the present invention wherein the desired longitudinal movement between the vertical support 26c is provided by pivotally mounting saddle assembly 40c on a "trapeze" assembly 70 which, in turn, is mounted to the side of fixed support 26c. This is similar to techniques used for mounting suspended electrical power lines to support towers.

What is claimed is:

1. A method of installing a segment of a highly tensioned, suspended pipeline, said method comprising:

affixing a first anchor at the beginning point of said segment of pipeline:

affixing a second anchor at the ending point of said segment of pipeline;

positioning a plurality of spaced, vertical supports between said first and said second anchors;

positioning a length of said pipeline on the ground between said first and said anchors, said length of pipeline being greater than the distance between said anchors;

affixing one end of said pipeline to said first anchor;

sequentially lifting said pipeline onto said vertical supports at predetermined pick-up points whereby said pipeline will be supported by said vertical supports and will sag significantly in a downward arc between adjacent vertical supports; and affixing the other end of said pipeline to said second anchor after said length of said pipeline has been lifted onto said vertical supports.

2. The method of claim 1 including:

applying and maintaining a tensile force in said length of said pipeline during the lifting of said pipeline onto said vertical supports.

3. The method of claim 2 wherein said one end of said pipeline is affixed to said first anchor prior to the lifting of said pipeline onto said vertical supports.

4. The method of claim 3 including:

affixing a stop to the other end of said pipeline;

and wherein said length of said pipeline is such that said stop will be substantially adjacent said second anchor when said pipeline has been lifted onto all of said vertical supports.

5. The method of claim 4 including:

positioning a support intermediate between two adjacent vertical supports to prevent transverse movement of said pipeline between said vertical supports.

6. The method of claim 5 including:

installing a second segment of said pipeline; and fluidly connecting said segment and said second segment of said pipeline together.

7. The method of claim 4 including:

pivotably connecting each of said vertical supports to the ground.

8. The method of claim 7 including:

pivotably connecting said pipeline to each of said vertical supports.

\* \* \* \* \*

UNITED STATES PATENT AND TRADEMARK OFFICE
CERTIFICATE OF CORRECTION

PATENT NO. : 6,353,988 B1
DATED : March 12, 2002
INVENTOR(S) : Robert E. Smith and James D. Hart It is certified that error appears in the above-identified patent and that said Letters Patent is hereby corrected as shown below:

Column 1,
Line 42, "install the pipeline) and" should read -- installing the pipeline) and --

Column 2,
Line 12, "ground along side the vertical" should read -- ground alongside the vertical --

Column 3,
Line 5, "FIG. 6 is a end view" should read -- FIG. 6 is an end view --
Line 15, "onto portions the pipeline" should read -- onto portions of the pipeline --
Line 51, "other at an uniform distance" should read -- other at a uniform distance --.
Line 54, "a slight, if any sag," should read -- a slight, if any, sag, --

Column 4,
Lines 4 and 5, "one-hundred (100) vertical supports" should read -- one hundred (100) vertical supports --
Lines 24 and 25, "45-65 feet for segment of" should read -- 45-65 feet for a segment of --
Line 27, "invention than was needed" should read -- invention than were needed --
Lines 47 and 48, "direction but movement in the" should read -- direction, but movement in the --

Column 5,
Line 3, "support as will be explained" should read -- support, as will be explained --
Line 9, "is laid on to the pliant" should read -- is laid onto the pliant --
Lines 25 and 26, "47 and pipe 24 is positioned" should read -- 47 and pipe 24 are positioned --
Line 27, "is secured therein by bolt" should read -- are secured therein by bolt --
Line 28, "53, welded to base 43 is" should read -- 53, welded to base 43, is --
Line 30, "as will be explain in" should read -- as will be explained in --
Line 31, "and install HTSP pipeline" should read -- and install the HTSP pipeline --
Line 45, "which to be described below." should read -- which will be described below. --
Line 55, "points; the exact distances" should read -- points, the exact distances --
Line 61, "port may have be temporarily" should read -- port may have to be temporarily --

UNITED STATES PATENT AND TRADEMARK OFFICE
CERTIFICATE OF CORRECTION

PATENT NO. : 6,353,988 B1
DATED : March 12, 2002
INVENTOR(S) : Robert E. Smith and James D. Hart It is certified that error appears in the above-identified patent and that said Letters Patent is hereby corrected as shown below:

Column 6,
Line 4, "(i.e. "pick-up point) is" should read -- (i.e. "pick-up point") is --
Line 21, "received in a arcuate recess" should read -- received in an arcuate recess --
Line 29, "55 is attached to segment" should read -- 55 is attached to the segment --
Line 30, "at precisely measured desired" should read -- at a precisely measured desired --
Line 56, "assembly and pipe is lifted" should read -- assembly and pipe are lifted --
Line 58, "53 FIGS. 6 and 8) of the" should read -- 53 (FIGS. 6 and 8) of the --

Column 7,
Line 4, "and pipe has been positioned" should read -- and pipe have been positioned --
Lines 21 and 22, "pipe should come into substantially abutment" should read -- pipe should come into substantial abutment --
Line 30, "20 until the desire length" should read -- 20 until the desired length --
Line 32, "anchor 25 is installed for" should read -- anchor 25 are installed for --
Line 35, "21 of an following segment" should read -- 21 of a following segment --
Line 50, "itself predominately by axial" should read -- itself predominantly by axial --
Lines 57 and 58, "provided by a slidably connection" should read -- provided by a slidable connection --

Column 8,
Line 13, "segment of pipeline:" should read -- segment of pipeline; --
Line 19, "said first and said anchors," should read -- said first and said second anchors, --

Signed and Sealed this

Eighteenth Day of June, 2002

*Attest:*

*Attesting Officer*

JAMES E. ROGAN
*Director of the United States Patent and Trademark Office*